Figure 3:
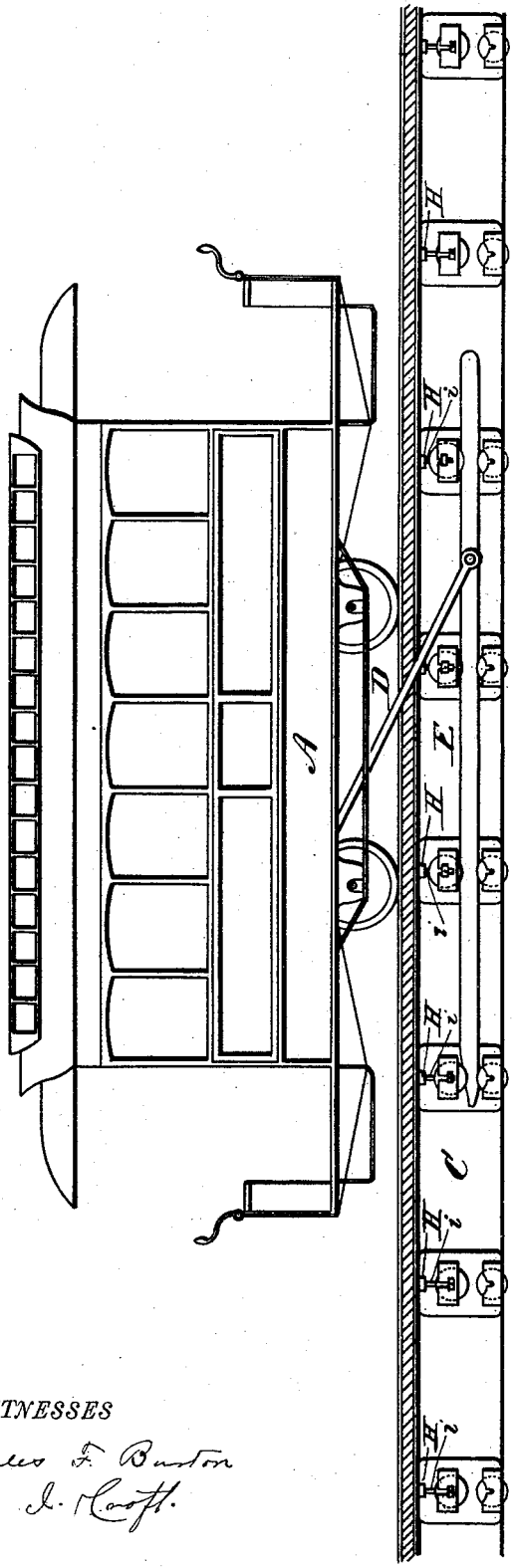

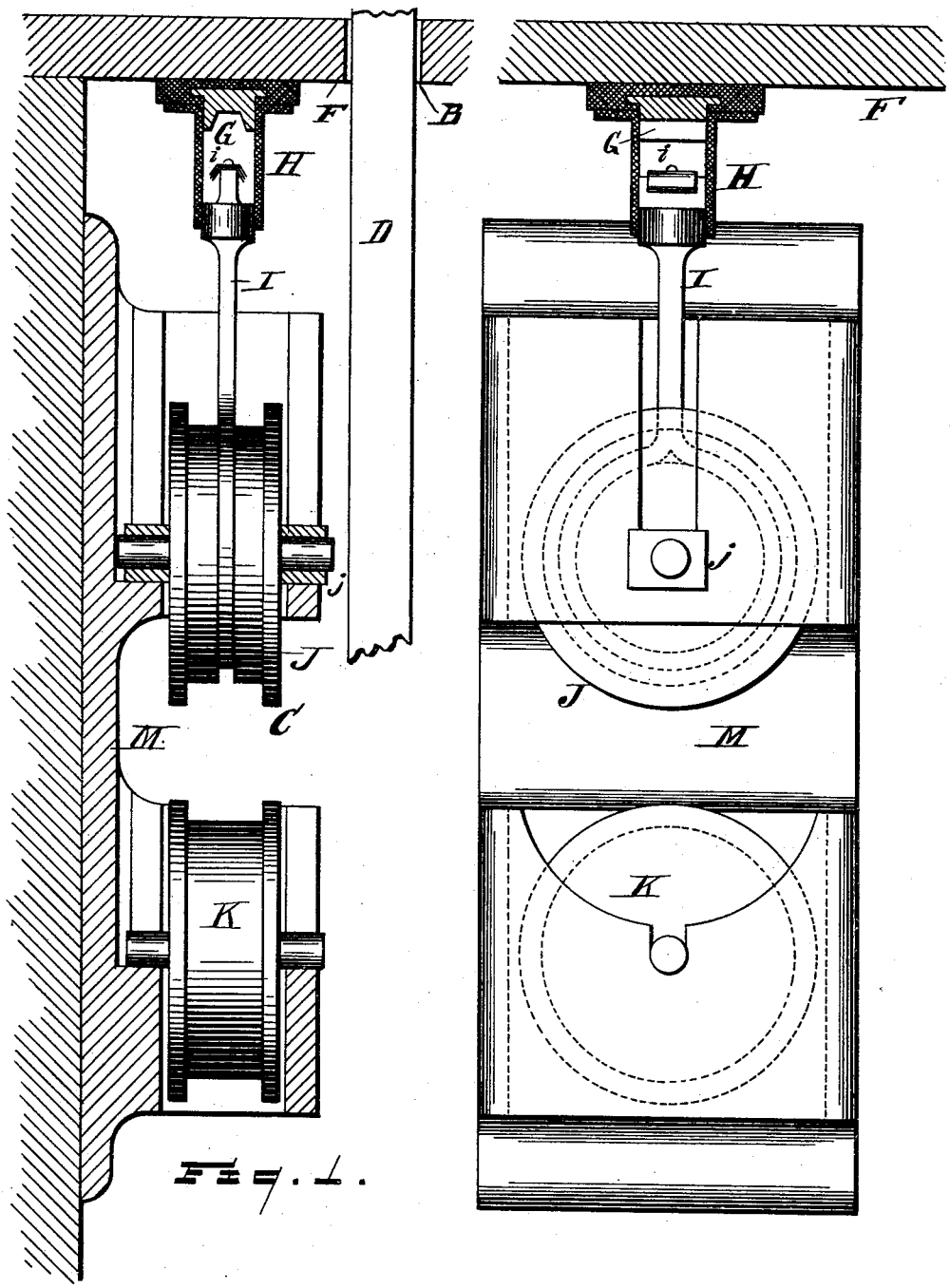

(No Model.) 3 Sheets—Sheet 2.

G. A. DUPUIS.
INCLOSED CONDUCTOR FOR ELECTRIC RAILWAYS.

No. 482,343. Patented Sept. 13, 1892.

WITNESSES
Charles F. Burton
Effie J. Kooft

INVENTOR
George A. Dupuis (No Model.) 3 Sheets—Sheet 3.
G. A. DUPUIS.
INCLOSED CONDUCTOR FOR ELECTRIC RAILWAYS.
No. 482,343. Patented Sept. 13, 1892.
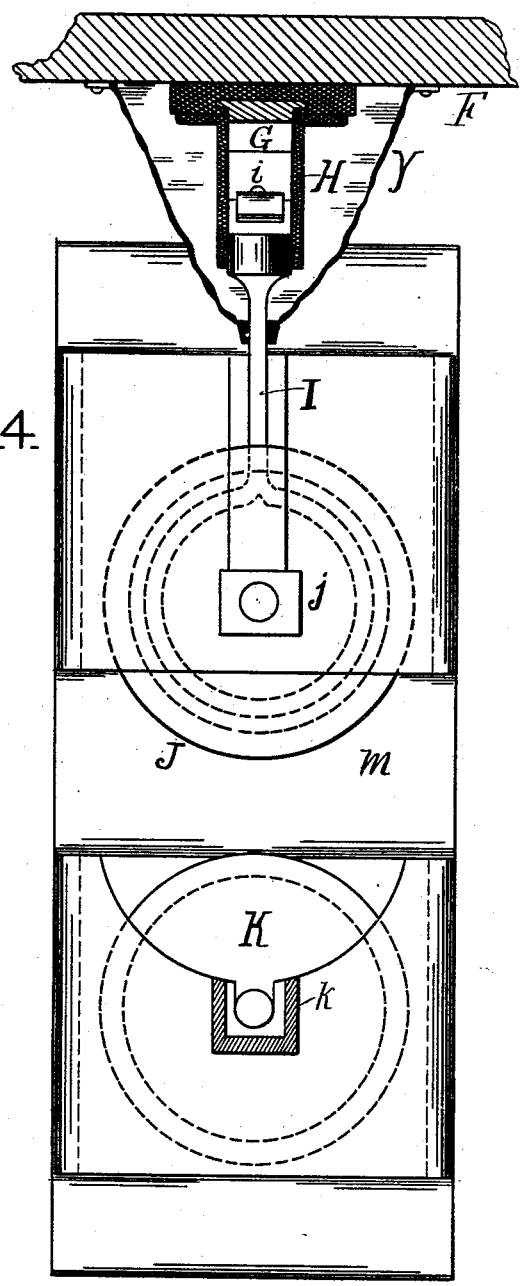
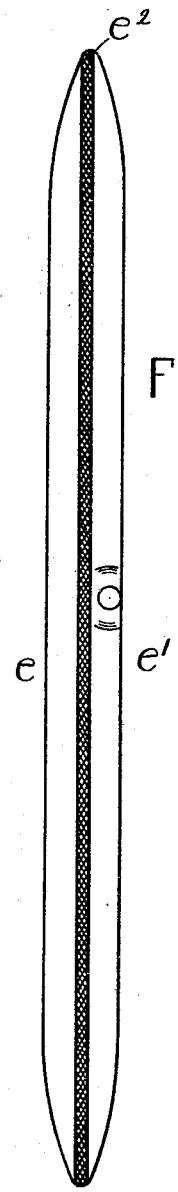
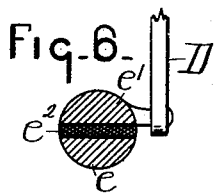
WITNESSES
F. Clough
Dell J. Browne
INVENTOR
George A. Dupuis
by Parker T Burton
his Attorneys.

UNITED STATES PATENT OFFICE.

GEORGE A. DUPUIS, OF DETROIT, MICHIGAN.

INCLOSED CONDUCTOR FOR ELECTRIC RAILWAYS.

SPECIFICATION forming part of Letters Patent No. 482,343, dated September 13, 1892.

Application filed May 16, 1891. Serial No. 393,041. (No model.)

*To all whom it may concern:*

Be it known that I, GEORGE A. DUPUIS, a citizen of the United States, residing at Detroit, in the county of Wayne and State of Michigan, have invented a new and useful Improvement in Electric Railways, of which the following is a specification.

This invention relates to electric railways or railways on which the cars are propelled by an electric motor carried with the car and receiving its motive force from a lead or line wire lying parallel with the track and with which electrical connection is made from the motor on the car.

The special object of this invention is a means for employing a lead or line wire that is at all times covered and insulated and out of electrical contact with interfering substances at all points except those which are in electrical contact with the motor on the car.

As is well known, an uninsulated or uncovered lead-wire is liable to a considerable loss of electrical force at all times, and this liability to loss of force is increased whenever the lead-wire is placed below the surface of the ground in a position to be out of the way. When the lead-wire is placed below the surface of the ground in a conduit arranged to receive it, if uninsulated it is liable to be effected by water or moisture, or dust or other foreign material, which serve to cause a leakage of the electrical force greater even than the same wire would suffer if above ground, and if insulated there arises the difficulty of making the necessary electrical connection between it and the motor on the car. I have overcome these difficulties and am able to employ an insulated lead-wire located in a conduit and below the surface of the ground and to make frequent and practically constant contact between it and the motor on the car by means of the mechanism shown and described in this specification and the drawings accompanying it.

Figures 1 and 2 are details of the contact-making device in the conduit. Fig. 3 is a diagram showing the conduit, the lead-wire, and the means for making electrical contact between the lead-wire and the motor on the car. Fig. 4 is a detail showing a protecting-diaphragm around the contact-plunger and an insulated box on the lower friction-roller. Fig. 5 is a detail of the traveling contact-rod, showing it made in two pieces insulated from each other. Fig. 6 is a cross-section of the traveling contact-rod.

A represents a car upon which is mounted a motor in the usual way or in any of the usual ways. Running parallel with the rails upon which the car travels is a conduit or open passage-way, of which the top is closed in, except a narrow slit B, left open for the passage of an arm D, that extends downward from the car A to the traveling contact-rod E. The conduit should be drained and protected as thoroughly as possible from the accumulation of any foreign material.

On the under side of the cover F of the conduit C is fastened the lead or main-line wire G. This is insulated from the cover and is insulated from the air at all parts and can only be reached at the points H H H, and there only by means of the piston-plungers I I I, which are fitted into the short cylinders or cups shown at the points H H H. The piston-plungers I I I are fitted with heads that fit in the cylinders H H H so tightly as to prevent the passage of air or water; or around the piston-plungers may be fitted flexible diaphragms Y, which permit a limited movement of the piston in the cylinder. The flexible diaphragm Y is secured to the conduit-cover F and to the piston-stem I, the joints at both points of attachment being made as nearly air and water tight as possible. At the ends *i i* of the plungers I I I are contact-pieces arranged to be brought by pressure into close electrical contact with the lead or line wire in the same manner that an electrical push-button is brought into contact with a lead-wire. The plungers I I I are brought into contact with the lead-wire by being pushed upward; but they normally remain some distance below the position they take when pushed upward, and are out of contact at all times, except when forced upward. The bottom end of the plunger I rests on or around the axle of the friction-roller J and the plunger is in electrical contact with the roller. The boxes *j j*, in which the axles of the friction-roller J rest, slide vertically in the bracket M, which is fixed to the side walls of the conduit and supports the rollers J and K. The friction-roller K is located directly below the roller J and rotates on its axis; but is otherwise fixed. The traveling contact piece or rod E is attached by an arm D to the car A and moves with the car as the car travels in either direction. It constantly travels on the friction-rollers K K K and under the rollers J J J, and as it moves in either direction lifts the rollers J J J until the ends *i i i* of the pistons I I I are forced into contact with the lead G, and the electrical force passes through the piston, through the rollers J, through the traveler E and arm D to the motor on the car, and only those pistons are in contact with the lead which are at the same time in contact with the traveling rod. The rod E should be sufficiently long, so that it will constantly press two of the pistons into contact with the lead—that is, it should be at least as long as the distance from one piston to the second succeeding piston.

The rollers K K K are mounted in insulated bearings K, (see Fig. 4,) or the rod E may be made in two parts *e e'*, the dividing plane being horizontal and the upper half being insulated from the lower half by an insulating-strip $e^2$, in which case the arm D would be electrically in contact with the upper half of E and not with the lower half. The return current may be on the rail or on an independent wire, as desired.

I desire to confine this specification to that part of my invention by which I am enabled to employ an electric-current conductor insulated at all parts, entirely disconnected from everything outside itself except at particular points where it is desired to connect it with the car-motor, and by which I am enabled to have that point of contact travel with the car or change as the car travels.

Having thus described my invention, what I claim as novel, and desire to have secured to me by Letters Patent, is—

1. The combination of an insulated electrical conductor, a traveling car, a traveling contact-maker connected to said car, and contact-pieces hung below said conductor and reaching through the insulation of said conductor, normally out of contact with said conductor, but arranged to be pushed upward by said traveling contact-maker into contact with said conductor and to drop by gravity out of electrical contact, substantially as and for the purpose described.

2. The combination of an insulated electrical conducting-wire, conducting piston rods or plungers reaching through the insulation of said electrical conductor, friction-rollers on the outer end of said plungers moving with them, fixed friction-rollers opposite the first-mentioned friction-rollers, and a contact-making traveler arranged to travel between said friction-rollers and of a thickness sufficient to force the rollers apart and the piston into contact with the main conductor, substantially as and for the purpose described.

3. In an electric railway, in connection with a friction-roller adapted to be brought into electrical contact with an insulated electric conveyer, an opposing friction-roller turning axially in insulated bearings, a car, and a traveling contact-maker adapted to pass between said friction-rollers, all combined and arranged as described.

4. In an electric conduit for electric railways, the combination of opposing friction-rollers, one of which is adapted to be pushed into electrical contact with an otherwise insulated electric conducting-wire, and a traveling contact-maker made in parts, one of said parts being an electrical conductor and being in electrical connection with the car, another of said parts being of insulating material and adapted to prevent the passage of electricity except to said car, substantially as and for the purpose described.

GEORGE A. DUPUIS.

Witnesses:
EFFIE I. CROFT,
CHARLES F. BURTON.